US009984158B2

(12) United States Patent
Edlund et al.

(10) Patent No.: US 9,984,158 B2
(45) Date of Patent: May 29, 2018

(54) FINDING SERVICES IN A SERVICE-ORIENTED ARCHITECTURE (SOA) NETWORK

(71) Applicant: Axis AB, Lund (SE)

(72) Inventors: Björn Edlund, Löberöd (SE); Joakim Ståhl, Lund (SE); Joakim Roubert, Lund (SE); Mikael Ranbro, Eslöv (SE); Staffan Olsson, Furulund (SE); Ted Hartzell, Lomma (SE)

(73) Assignee: Axis AB, Lund (SE)

( * ) Notice: Subject to any disclaimer, the term of this patent is extended or adjusted under 35 U.S.C. 154(b) by 284 days.

(21) Appl. No.: 14/217,978

(22) Filed: Mar. 18, 2014

(65) Prior Publication Data
US 2015/0269257 A1     Sep. 24, 2015

(51) Int. Cl.
G06F 17/30 (2006.01)
H04L 29/08 (2006.01)

(52) U.S. Cl.
CPC ........ G06F 17/30864 (2013.01); H04L 67/10 (2013.01); H04L 67/16 (2013.01); H04L 67/1068 (2013.01)

(58) Field of Classification Search
CPC ............. G06F 9/44505; G06F 21/6218; G06F 17/30864; G06F 17/30902
See application file for complete search history.

(56) References Cited

U.S. PATENT DOCUMENTS

| | | | |
|---|---|---|---|
| 6,338,082 B1* | 1/2002 | Schneider | H04L 61/3015 709/203 |
| 2002/0194183 A1* | 12/2002 | Yoakum | H04L 29/06027 |
| 2003/0187841 A1* | 10/2003 | Zhang | G06F 17/30864 |
| 2007/0033167 A1* | 2/2007 | Basu | G06F 17/30864 |
| 2008/0307082 A1* | 12/2008 | Cai | G06F 15/17337 709/223 |

(Continued)

FOREIGN PATENT DOCUMENTS

| | | |
|---|---|---|
| CN | 101719059 A | 6/2010 |
| CN | 102027465 A | 4/2011 |

(Continued)

OTHER PUBLICATIONS

Wang, Zhenqi et al., "A P2P Network Based Architecture for Web Service," International Conference on Wireless Communications, Networking and Mobile Computing, 2007, WICOM 2007, IEEE, Piscataway, NJ, USA, Sep. 21, 2007, pp. 3446-3449.

(Continued)

Primary Examiner — Scott A Waldron
Assistant Examiner — Fatima Mina
(74) Attorney, Agent, or Firm — Snyder, Clark, Lesch & Chung, LLP

(57) ABSTRACT

A method and system for finding services in a service-oriented architecture network may include receiving, in a local service registry from a client, a search query for a particular service. The local service registry may include a local database listing registered services. The network may include querying the local database to determine a first list of services that satisfy the search query and determining a neighboring service registry, in a network of service registries, based on a property other than a property of the particular service being searched for. The method may include sending the search query to the neighboring service registry and receiving, from the neighboring service registry, a second list of services, registered with the neighboring service registry, that satisfy the search query. The method may include returning, to the client, the first list of services and the second list of services that satisfy the search query.

20 Claims, 13 Drawing Sheets

(56) References Cited

U.S. PATENT DOCUMENTS

2009/0070456 A1 3/2009 Brown et al.
2010/0010975 A1* 1/2010 Morris .............. H04L 29/12066
 707/E17.014
2010/0017368 A1* 1/2010 Mao ........................ G06F 9/465
 707/E17.014
2012/0033577 A1* 2/2012 Chiang ............... H04L 12/2834
 370/252
2012/0290700 A1* 11/2012 Li .......................... H04L 61/10
 709/223

FOREIGN PATENT DOCUMENTS

| CN | 102663009 A | 9/2012 |
| JP | 2005301430 A | 10/2005 |
| WO | 2013081962 A1 | 6/2013 |

OTHER PUBLICATIONS

Lin, Hongqi et al., "Research on Distributed Architecture Based on SOA," International Conference on Communication Software and Networks, 2009, ICCSN '09, IEEE, Piscataway, NJ, USA, Feb. 27, 2009, pp. 670-674.

Extended European Search Report dated Jul. 10, 2014, issued in corresponding European Application No. 14161450.3, 9 pages.

Lopez-Ramos, Mario, "Designing a novel SOA architecture for security and surveillance WSNs with COTs," IEEE International Conference on Mobile Adhoc and Sensor Systems, 2007, MASS 2007, Oct. 8-11, 2007, pp. 1-6.

Bianchini, Devis, "Enabling semantic search in P2P systems through a three-layer Distributed Service Registry," Proceedings of the Seventeenth Italian Symposium on Advanced Database Systems, SEBD 2009, Camogli, Italy, Jun. 21-24, 2009, pp. 1-11.

* cited by examiner

PROPERTY TABLE
460

| | |
|---|---|
| INSTANCE ID 462 | 6529 |
| INTERFACE 464 | STORAGE SERVICE |
| SERVICE FORMAT 468 | JSON |
| TRANSPORT PROTOCOL 470 | NODE PROTOCOL |
| CPU RANKING 472 | 20/100 |
| DISK SPACE 474 | 1 TB |
| RAM 476 | 2 GB |

FINDING SERVICES IN A SERVICE-ORIENTED ARCHITECTURE (SOA) NETWORK

FIELD

This disclosure generally relates to finding services in a service-oriented architecture (SOA) network.

BACKGROUND

Service-oriented architecture (SOA) is a software design and software architecture design methodology based on units of software providing application functionality as services to other applications. A service is a unit of functionality. Services can be combined by other software applications to provide the complete functionality of a larger software application. SOA makes it easier for computers connected over a network to cooperate.

SUMMARY

In one embodiment, a method may include (a) receiving, in a local service registry from a client, a search query for a particular service. In this embodiment, the local service registry includes a local database listing services registered with the local service registry. The local service registry is in a network of service registries. The method may include (b) querying the local database to determine a first list of services that satisfy the search query. The method may include (c) determining a neighboring service registry, in the network of service registries, based on a property other than a property of the particular service, wherein the neighboring service registry neighbors the local service registry. The method may include (d) sending the search query to the neighboring service registry. In this embodiment, the neighboring service registry includes a neighboring database listing services registered with the neighboring service registry. The method may include (e) receiving, from the neighboring service registry, a second list of services, registered with the neighboring service registry, that satisfy the search query. The method may include (f) returning, to the client, the first list of services and the second list of services that satisfy the search query.

In one embodiment, the property of the particular service is a particular property and the search query identifies the particular service and the particular property of the particular service. In this embodiment, the method includes determining the neighboring service registry based on a property other than the particular property.

In another embodiment, the method includes determining the neighboring service registry based on a plurality of properties, wherein the plurality of properties are not properties of the particular service, and wherein each of the plurality of properties is weighted.

In another embodiment, the search query indicates the particular service as data storage, and the property other than the property of the service includes bandwidth, geographic location, open channels, latency, multicast capability, number of hops, cost, or network type.

In one embodiment, the network of service registries is a tree network of service registries. In another embodiment, the network of service registries is a mesh network of service registries.

In one embodiment, the method may also include (g) receiving the search query in the neighboring service registry, querying the neighboring service registry to determine the second list of services that satisfy the search query, and (i) sending the second list to the local service registry.

In one embodiment, the neighboring service registry is a requesting service registry. In this embodiment, the method may include (j) determining whether the second list of services is sufficient. When the second list of services is not sufficient, the method may include determining another neighboring service registry, in the network of service registries, based on the property other than the property of the particular service, wherein the other neighboring service registry neighbors the requesting service registry. When the second list of services is not sufficient, the method may include sending the search query to the other neighboring service registry, wherein the other neighboring service registry includes another neighboring database listing services registered with the other neighboring service registry. When the second list of services is not sufficient, the method may include receiving, from the other neighboring service registry, another list of services, registered with the other neighboring service registry, that satisfy the search query, wherein the second list includes the other list.

In one embodiment, the method includes repeating element (j) in successive other nodes.

A system is also described herein. The system may include a device, which in turn includes a memory to store a local database listing services registered with a local service registry. In this embodiment, the local service registry is in a network of service registries. The device may also include a processor to receive a search query for a particular service from a client. The processor in this embodiment may also query the local database to determine a first list of services that satisfy the search query, and determine a neighboring service registry, in the network of service registries, based on a property other than a property of the particular service, wherein the neighboring service registry neighbors the local service registry. In this embodiment, the device includes a transmitter to send the search query to the neighboring service registry. In this case, the neighboring service registry includes a neighboring database listing services registered with the neighboring service registry. The device in this embodiment may also include a receiver to receive, from the neighboring service registry, a second list of services, registered with the neighboring service registry, that satisfy the search query, wherein the processor is configured to return to the client, the first list of services and the second list of services that satisfy the search query.

In one embodiment, the property of the particular service is a particular property and the search query identifies the particular service and the particular property of the particular service. In this embodiment, the processor may be configured to determine the neighboring service registry based on a property other than the particular property.

In one embodiment, the processor is configured to determine the neighboring service registry based on a plurality of properties, wherein the plurality of properties are not properties of the particular service, and wherein the processor is configured to weigh each of the plurality of properties.

In one embodiment, the search query indicates the particular service as data storage, and the property other than the property of the service includes bandwidth, geographic location, open channels, latency, multicast capability, number of hops, cost, or network type.

In one embodiment, the network of service registries is a tree network of service registries. In another embodiment, the network of service registries is a mesh network of service registries.

The system may include another device. The other device may include a memory to store the neighboring database. The other device may include a receiver to receive the search query, and a processor configured to query the neighboring database to determine the second list of services that satisfy the search query. The other device may include a transmitter to send the second list to the local service registry.

In one embodiment, the neighboring service registry is a requesting service registry. In this embodiment, the processor in the other device is configured to determine whether the second list of services is sufficient and, when the second list of services is not sufficient. The processor may also be configured to determine another neighboring service registry, in the network of service registries, based on the property other than the property of the particular service, wherein the other neighboring service registry neighbors the requesting service registry. The processor may also be configured to send the search query to the other neighboring service registry, wherein the other neighboring service registry includes another neighboring database listing services registered with the other neighboring service registry. The receiver may be configured to receive, from the other neighboring service registry, another list of services, registered with the other neighboring service registry, that satisfy the search query. The second list includes the other list.

The system may also include additional devices including memories, receivers, processors, and transmitters configured as the other device to successively search for services that satisfy the query.

In another embodiment, a method may include determining a topology of a network of service registries corresponding to a particular service. In this embodiment, each of the service registries lists instances of services registered with the corresponding service registry. Determining the topology may include determining, for each service registry, one or more neighboring service registries based on a property other than a property of the particular service.

The network topology of service registers may be an overlay network on a network of the plurality of nodes. In such an embodiment, the method may include determining a plurality of topologies for the service registries, each topology corresponding to a different particular service.

DETAILED DESCRIPTION

Figure 1:
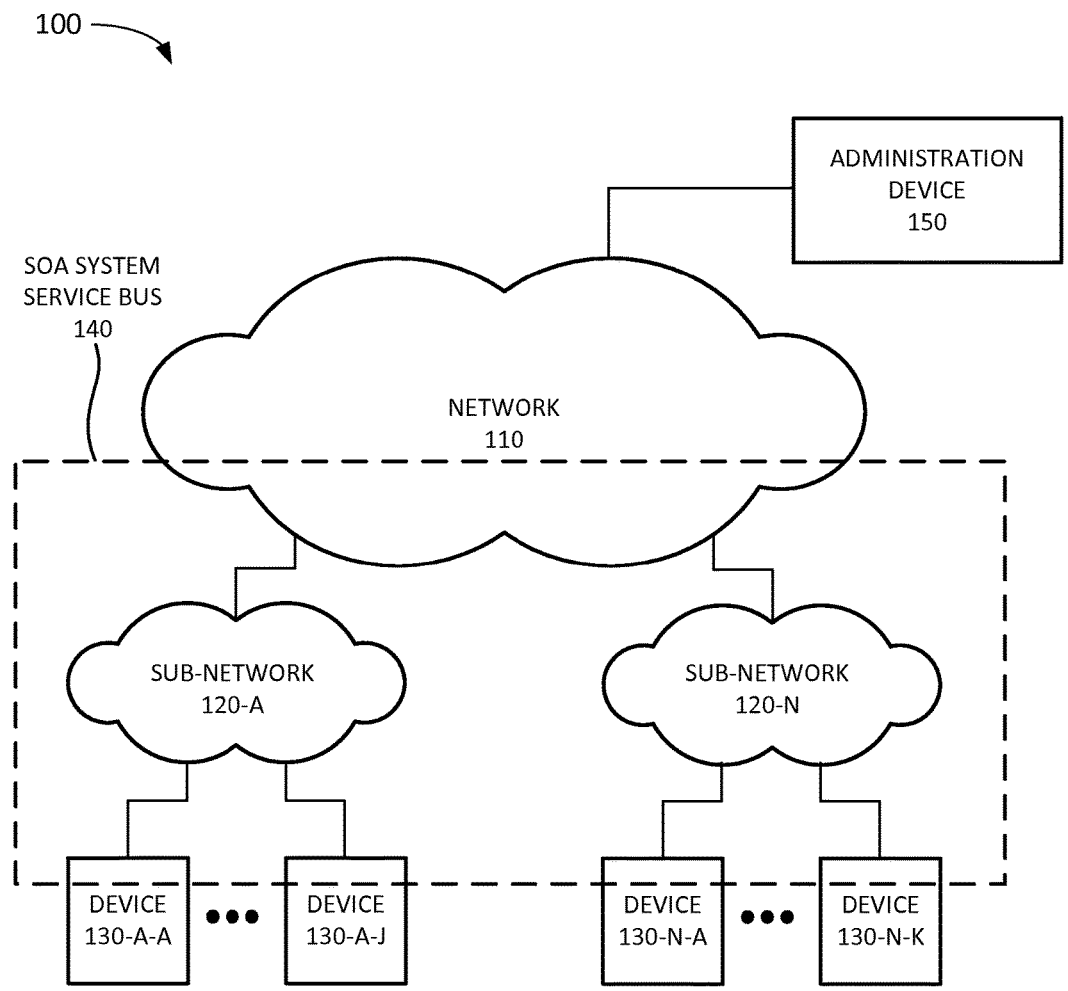
FIG. 1 is a block diagram illustrating an exemplary environment according to one or more embodiments described below.

The following detailed description refers to the accompanying drawings. The same reference numbers in different drawings identify the same or similar elements.

As described below, a network of devices may communicate over a network and may form part of a system that provides an array of various services. Different devices may provide different services at different times and the system may need to locate or search for a device hosting a particular service.

In order to find services offered by different devices, devices may register offered services in a service registry. In one embodiment, the service registry may be centralized in the network. In such an embodiment, all services in the network are registered in the central service registry. Because there is only one, central service registry, it is always in sync and relatively easy to maintain. A central service registry, however, creates a single point of failure. That is, if the central service registry fails, services may be difficult if not impossible to find. Further, a central service registry does not scale very well. That is, as the network grows exponentially, the processing speed and available bandwidth of the service registry also grows exponentially.

In another embodiment, the service registry may be distributed among devices in the network (e.g., a full copy of the registry may be replicated). This embodiment allows for additional fault tolerance over the centralized service registry. On the other hand, as the network grows, synchronization of the registry among devices becomes increasingly difficult and network traffic may become an issue.

In yet another embodiment, service registries are distributed among devices in the network, but the service registries may not be identical. In this embodiment, services may register with a local service registry. Service registries may not be aware of all the services in the network, but may be aware of local services. Finding service not hosted locally, therefore, may pose a challenge. To find a service in the network, a client (looking for a service) may request a service from (e.g., send a query to) the local service registry. If the local service registry cannot satisfy the request, the request can be forwarded to nearby service registries (e.g., one or more neighboring service registries near the local service registry). This embodiment allows for greater fault tolerance (as opposed to a central service registry) while reducing network traffic for syncing (as opposed to a fully distributed service registry). In one embodiment, the search request (query) for a particular service may be forwarded to a neighboring service registry in the network, where the neighboring node is selected based on a property other than a property of the particular service being searched for. For example, a request for a data storage service may be forwarded to a neighboring service registry based on network latency (e.g., a property other than data storage). Selecting neighboring nodes in this way may allow for rapidly finding services that are not hosted locally.

FIG. 1 is a block diagram of an exemplary environment 100 in which the systems and/or methods described can be implemented. As shown in the embodiment of FIG. 1, environment 100 includes a network 110, sub-networks 120-A to 120-N (referred to collectively as "sub-networks 120" and individually as "sub-network 120"), devices 130-A-A to 130-N-K (referred to collectively as "devices 130" and individually as "device 130"), and administration device 150. Device 130-N-K refers to the Kth device 130 in sub-network 120-N. In this embodiment, the components in environment 100 form a service-oriented architecture (SOA) system service bus 140.

Network 110 enables sub-networks 120 and/or devices 130 to communicate with each other. Network 110 may include one or more circuit-switched networks and/or packet-switched networks. For example, in one embodiment, network 110 includes a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks.

Sub-network 120 may include a LAN (e.g., a Layer 2 network) and/or a private network (e.g., a Layer 3 network). Sub-network 120 may interconnect one or more devices 130. For example, sub-network 120-A may interconnect devices 130-A-A to 130-A-J. Device 130 may include any device configured to communicate via SOA system service bus 140, for example.

Device 130 may include a server computer device, such as a Hypertext Preprocessor (PHP) server device, a C program server device, a Linux server device, a Windows server device, and/or another type of server device; a personal computer device, such as a desktop, laptop, tablet, a mobile communication device, and/or another type of personal computer device running Windows, Linux, Android, iOS, and/or another operating system; a monitoring device, such as a visible light camera, an infrared (IR) camera, a heat signature camera; a microphone; an alarm sensor, such as a motion sensor, a heat sensor, a pressure sensor, and/or another type of alarm sensor; a microcontroller computer device; and/or another type of computer device. While devices 130 are shown as connected to a sub-network 120, a particular device 130 may connect directly to network 110.

In one embodiment, SOA system service bus 140 is implemented between devices 130 on top of an existing network topology. SOA system service bus 140 may enable different types of devices 130, and/or devices 130 implemented using different platforms, to communicate using a service oriented architecture. SOA system service bus 140 may enable a first device 130 to request a particular service from any device 130 (e.g., itself or another device 130). Thus, a client (e.g., itself a "service" or a "client service") hosted by first device 130 may call upon a service hosted by a second device 130 (e.g., when the service is not available in first device 130). A first service (e.g., in first device 130) that requests another service (e.g., in second device 130) is referred to as a "client" or a "client service" as having initiated the request. The first service may also provide services to other services in the network, for example.

In one embodiment, a service is accessed via a standardized service interface. Each type of service may be associated with a particular service interface (e.g., a different service interface). A client requesting a service may thus communicate with a service interface and the client may be agnostic with respect to the actual implementation of the service. In other words, implementations of services communicate with each other using protocols defined by the service interfaces so that each implementation does not have to be concerned with the others' implementations. A running service implementation, associated with a particular service interface, may be referred to as a service instance. A device 130 that includes a service host (e.g., a device that hosts a service) may keep track of available service instances with a service registry (e.g., a list or database of services). SOA system service bus 140 may enable communication between devices 130 to locate a requested service by searching service registries of service hosts in devices 130.

Administration device 150 may enable an administrator to configure or otherwise manage SOA system service bus 140. For example, administration device 150 may include a portable communication device (e.g., a mobile phone, a smart phone, a phablet device, a global positioning system (GPS) device, and/or another type of wireless device); a personal computer or workstation; a server device; a laptop, tablet, or another type of portable computer; and/or any type of device with communication capability.

Like network 110, sub-network 120 may include one or more circuit-switched networks and/or packet-switched networks. For example, sub-network 120 may include a LAN, a WAN, a MAN, a PSTN, an ad hoc network, an intranet, the Internet, a fiber optic-based network, a wireless network, and/or a combination of these or other types of networks.

Although FIG. 1 shows exemplary components of environment 100, in other implementations, environment 100 may include fewer components, different components, differently arranged components, or additional components than depicted in FIG. 1. Additionally or alternatively, any one device in environment 100 (or any group of devices) may perform functions described as performed by one or more other devices in environment 100.

Figure 2:
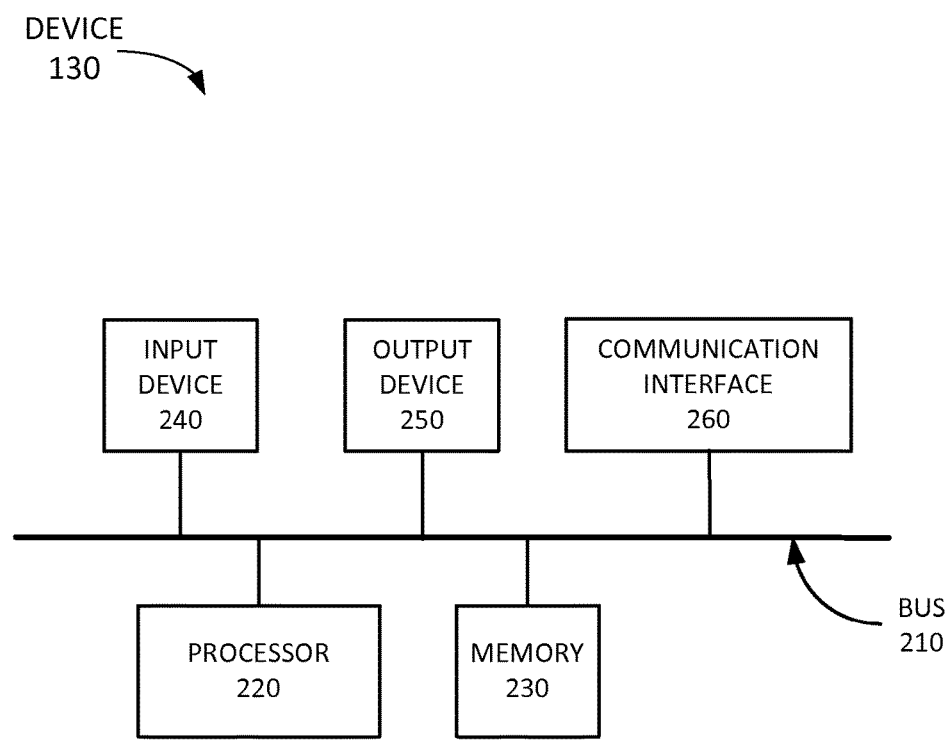
FIG. 2 is a block diagram illustrating exemplary components of a device of FIG. 1.

FIG. 2 is a block diagram illustrating exemplary components of device 130. As shown in FIG. 2, device 130 may include a bus 210, a processor 220, a memory 230, an input device 240, an output device 250, and a communication interface 260.

Bus 210 may include a path that permits communication among the components of device 130. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of volatile and/or dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 130. Input device 240 may include, for example, a keyboard, a mouse, a pen, a microphone, a remote control, an audio capture device, an image and/or video capture device, a touch-screen display, and/or another type of input device. In one embodiment, device 130 may be managed remotely and may not include input device 240. In other words, device 130 may be "headless" and may not include a keyboard, for example.

Output device 250 may output information to an operator of device 130. Output device 250 may include a display, a printer, a speaker, and/or another type of output device. For example, device 130 may include a display, which may include a liquid-crystal display (LCD) for displaying content to the customer. In one embodiment, device 130 may be managed remotely and may not include output device 250. In other words, device 130 may be "headless" and may not include a display, for example.

Communication interface 260 may include a transceiver (e.g., a transmitter and/or a receiver) that enables device 130 to communicate with other devices and/or systems. Communications interface 260 may communicate via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As described below, device 130 may perform certain operations relating to finding services (e.g., nearby services) in a SOA network. Device 130 may perform these operations in response to processor 220 executing software instructions contained in a computer-readable medium, such as memory 230. A computer-readable medium includes a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired (e.g., fixed) circuitry may be used in place of, or in combination with, software instructions to implement processes described herein. Thus, implementations described herein are not limited to any specific combination of hardware circuitry and software.

Although FIG. 2 shows exemplary components of device 130, in other implementations, device 130 may include fewer components, different components, additional components, or differently arranged components than depicted in FIG. 2. Additionally or alternatively, one or more components of device 130 may perform one or more tasks described as performed by one or more other components of device 130. Administration device 150 may be configured similarly as device 130.

Figure 3:
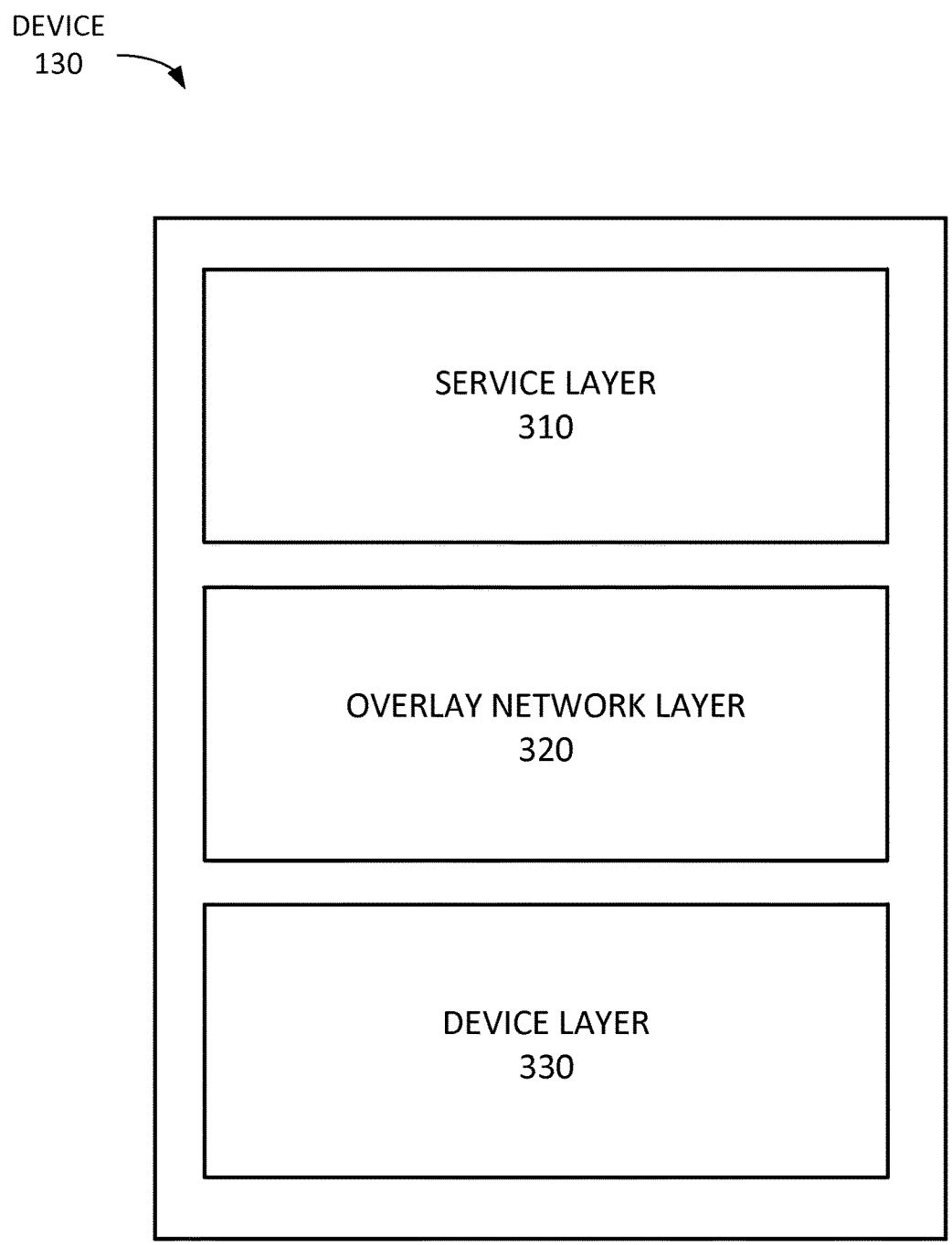
FIG. 3 is a block diagram illustrating exemplary functional layers of a device of FIG. 1.

FIG. 3 is a block diagram illustrating exemplary communication layers of device 130. The functional components of device 130 may be implemented, for example, by processor 220 executing instructions from memory 230. Additionally or alternatively, the functional components of device 130 may be implemented via hardwired (e.g., fixed) circuitry of one or more ASICs. As shown in FIG. 3, device 130 may include a service layer 310, an overlay network layer 320, and a device layer 330.

Service layer 310, in one embodiment, enables clients to search for service instances of a particular service type and enables clients to send requests to particular service instances. A service may be accessed via a standardized service interface that, in one embodiment, is agnostic to the actual implementation of the service. A service instance may be associated with explicit boundaries. In this embodiment, a particular process running on device 130, and/or particular data stored on device 130, either resides within the service instance or outside of the service instance without ambiguity. A service instance may be autonomous with respect to other service instances. For example, a particular service instance may be modified (e.g., code may be rewritten) without negatively impacting other service instances interacting with the particular service instance. A service may share a schema and/or a contract with other service instance (of the same type or of different type), but, in one embodiment, does not share the service implementation. A schema specifies the format and content of messages sent or received by the service interface. A contract specifies permissible sequences of messages sent or receive by the service interface.

Overlay network layer 320, in one embodiment, implements an overlay network on top of an existing network topology. Overlay network layer 320 may be responsible for routing traffic through firewalls and/or dealing with network address translation (NAT) in the underlying network topology. In one embodiment, the overlay network topology (e.g., which may be different than the underlying network topology) includes nodes organized in a tree structure. The overlay network topology logically connects the nodes. In other embodiments, the overlay network topology may include a different type of structure (e.g., a mesh topology). Each service host in a device 130 may correspond to a node in the overlay network and may be assigned a node identifier (ID). As noted above a device 130 may include multiple service hosts and/or multiple nodes. Device 130 may be described as including one host that corresponds to one node. The nodes may be connected via the network topology, such as a routing tree, and a node may send a message to another node via the routing tree. In one embodiment, a node may send a message to another node via the underlying network topology without the message traversing the overlay network topology. Each node may store information (e.g., addresses of the underlying network, such as network 110) to reach its neighbors in the overlay network (as well as the underlying network). Overlay network layer 320 may correspond to a communication layer between the nodes and may use multiple network topologies to realize a particular function. For example, when searching service registries for a particular type of service, overlay network layer 320 may traverse edges of a tree of nodes while searching through service registries. In one embodiment, when sending a message from a first node to a second node, overlay network layer 320 may send the message directly from the first node to the second node, rather than by following edges of the tree. Overlay network layer 320 may provide node IDs to service layer 310 and service layer 310 may send messages to particular node IDs without needing to know the underlying network topology.

In one embodiment, device layer 330 performs device discovery during initial installation of SOA system service bus 140. Device layer 330 and/or overlay network layer 320 may also perform node discovery subsequent to initial installation, and/or may rediscover lost nodes that went offline and that re-join the overlay network at a later time. In one embodiment, overlay network layer 320 manages a shared secret for the overlay network, such as a certificate, that enables the nodes to verify each other's identity. Overlay network layer 320 may form a topology (e.g., a routing tree or mesh) for the overlay network based on one or more metrics of nearness. However, a message from a first node to a second node need not traverse the routing tree and may instead be sent directly from the first node to the second node. In another embodiment, the message from the first node to the second node traverses the routing tree. Furthermore, overlay network layer 320 may send multicast messages based on multicast groups. Moreover, overlay network layer 320 may provide a quality of service (QoS) guarantee to service layer 310.

While network layer 320 generally deals with "nodes," device layer 330 generally deals with "devices." Device layer 330 corresponds to the lower levels of functionality of device 130, including functionality required to communicate using the underlying network topology (e.g., network 110 and/or sub-network 120). For example, device layer 330 may implement Layers 1 through 6 of the Open Systems Interconnection (OSI) model (e.g. the Physical layer, Data Link layer, Network layer, Transport layer, Session layer, and Presentation layer). Implementation of these layers may include routing Ethernet frames, routing Internet Protocol (IP) packets, session management, encrypting and decrypting packets, retransmitting lost packets, etc.

Although FIG. 3 shows exemplary functional components of device 130, in other implementations, device 130 may include fewer functional components, different functional components, differently arranged functional components, or additional functional components than depicted in FIG. 3. Additionally, any one of the components (or any group of components) of device 130 may perform functions described as performed by one or more other functional components of device 130.

Figure 4A:
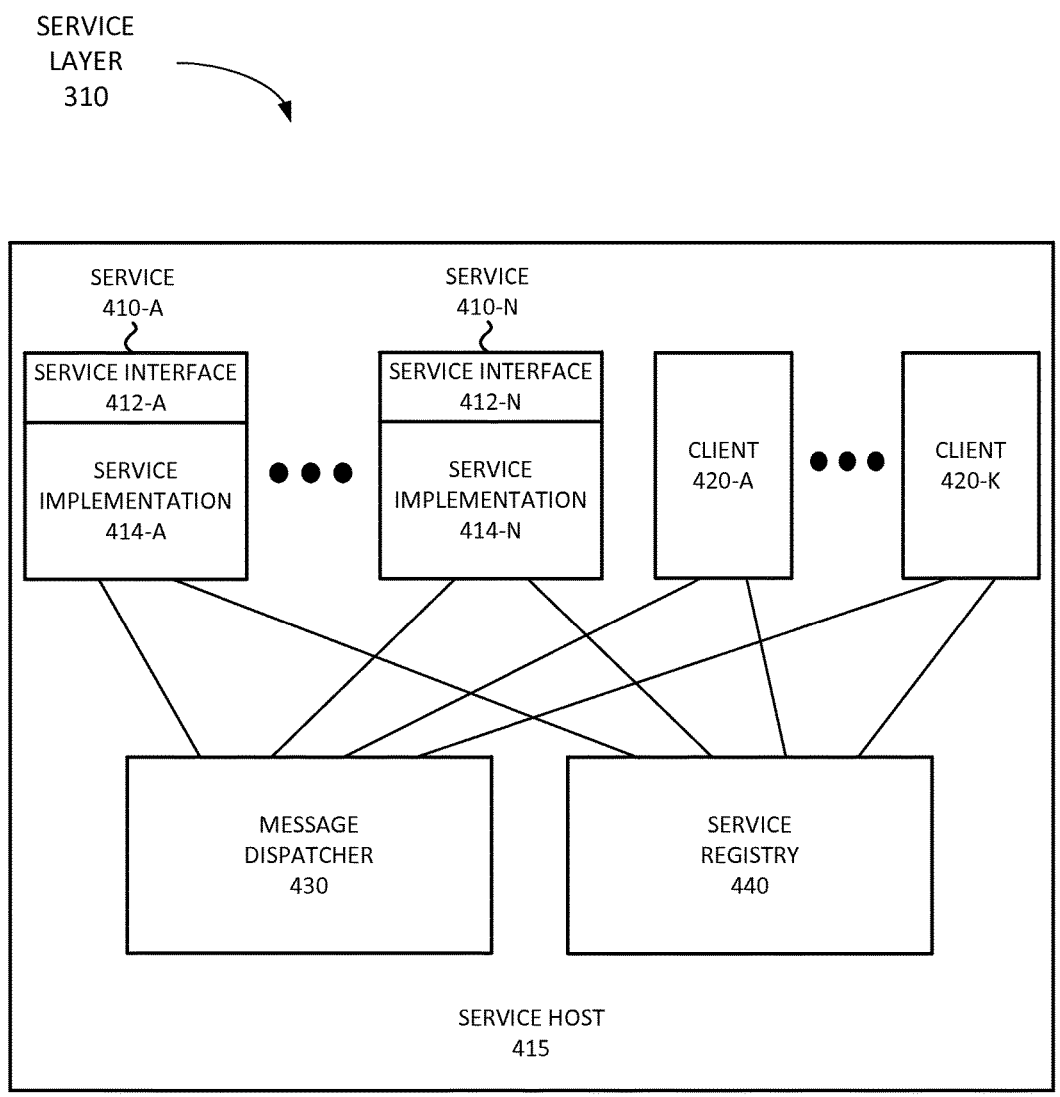
FIG. 4A is a block diagram illustrating exemplary functional components of a service layer of FIG. 3.

FIG. 4A is a block diagram illustrating exemplary functional components of service layer 310. As shown in FIG. 4A, service layer 310 includes a service host 415. Service host 415 may include one or more services 410-A to 410-N (referred to collectively as "services 410" and individually as "service 410"), one or more clients 420-A to 420-K (referred to collectively as "clients 420" and individually as "client 420"), a message dispatcher 430, and a service registry 440.

Service 410 corresponds to a service instance associated with service host 415 of service layer 310 of device 130. In one embodiment, service 410 includes a service interface 412 and a service implementation 414. Service interface 412 may include a communication protocol, such as a standardized communication protocol. In one implementation, the communication protocol includes a unique name and version. Service interface 412 may be specified using a Simple Object Access Protocol (SOAP) interface specification, a JavaScript Object Notation (JSON) interface specification, and/or another type of interface specification. Service implementation 414 includes the implementation of service 410. Service implementation 414 processes requests received via service interface 412 and/or responds to service requests through service interface 412. Service interface 412 may convert responses received from service implementation 414 into a particular format compatible with the proper protocol, which client 420 uses to exchange messages with service 410.

In one embodiment, client 420 requests a service instance of a particular service type by sending a request to service registry 440. Once a service instance is identified and selected, client 420 may send a request to the identified and selected particular service instance via message dispatcher 430. As discussed above, clients 420 may also be services 410. The term "client" or "client service" identifies the service as one that is requesting another service.

Message dispatcher 430 receives incoming messages from client 420 and directs them to service 410 that is the intended recipient of the incoming message. Furthermore, message dispatcher 430 may receive messages from a service and send the message to a particular client 420. If the destination of the incoming message is not on the same device 130 as message dispatcher 430, then the message may be forwarded to the overlay network layer 320 for forwarding to the correct device 130. Services 410 and clients 420 may function as endpoints in the overlay network implemented by overlay network layer 320. Thus, in one embodiment, overlay network layer 320 may maintain a routing table based on the routing tree of the overlay network. The routing table may include a list of next hop destinations for particular node IDs. Message dispatcher 430 may identify a next hop destination for the outgoing ID and may provide the message to overlay network layer 320 for delivery. Thus, in this embodiment, message dispatcher 430 implements a request-response messaging mechanism.

Service registry 440 maintains a list of deployed services 410 along with properties associated with the deployed services (e.g., instances of services). Exemplary components of service registry 440 are described in more detail below with reference to FIG. 4C. A service 410 may register with service registry 440 by providing service registry 440 with a description of the service (e.g., including properties of the service). Because clients 420 may also be services 410, clients 420 may also register with service registry 440.

Figure 4B:
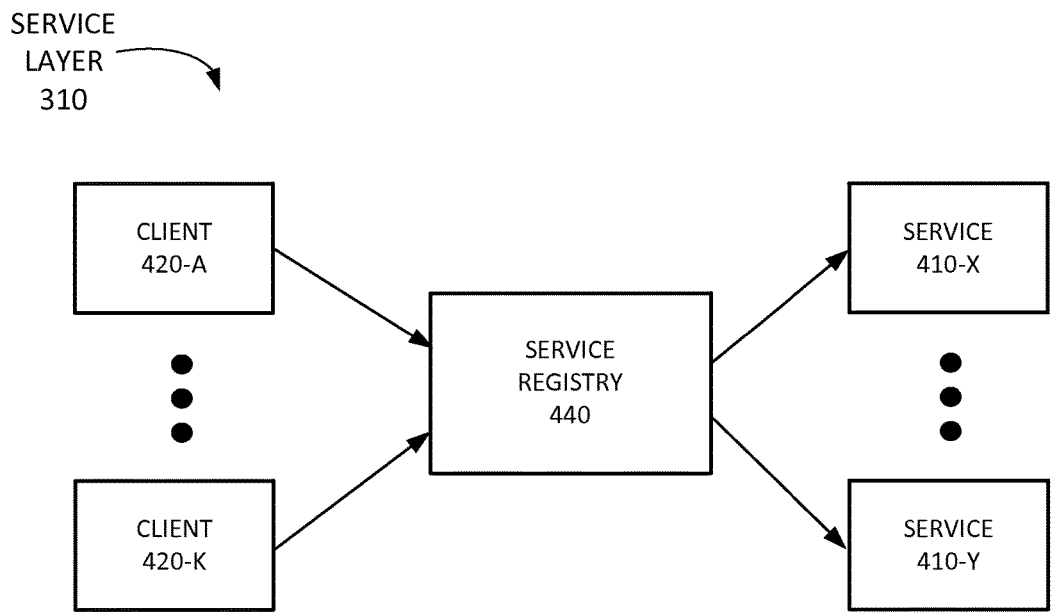
FIG. 4B is a block diagram illustrating the functionality of the service registry of FIG. 4A.

FIG. 4B is a block diagram illustrating the functionality of service registry 440. As shown in FIG. 4B, service registry 440 may receive search queries from clients 420. A search query may specify a particular service type, one or more requested properties for the particular service type, a requested number of hits, and/or one or more other parameters. Service registry 440 may identify services 410 that satisfy the search query. If the number of requested hits is not satisfied by service registry 440, service registry 440 may forward a query to another service registry 440 (e.g., an adjacent service registry 440) in the overlay network. In one embodiment, service registry 440 does not select a particular service instance based on a search query. Rather, in this embodiment, service registry 440 returns the results of the query to client 420 and client 420, which originated the query, may select a particular service instance from the search results. In another embodiment, service registry 440 selects the particular service instance based on the search query from the results of the query.

Although FIGS. 4A and 4B show exemplary functional components of service layer 310, in other implementations, service layer 310 may include fewer functional components, different functional components, differently arranged functional components, or additional functional components than depicted in FIGS. 4A and 4B. Additionally, any one of the components (or any group of components) of service layer 310 may perform functions described as performed by one or more other functional components of service layer 310.

Figure 4C:
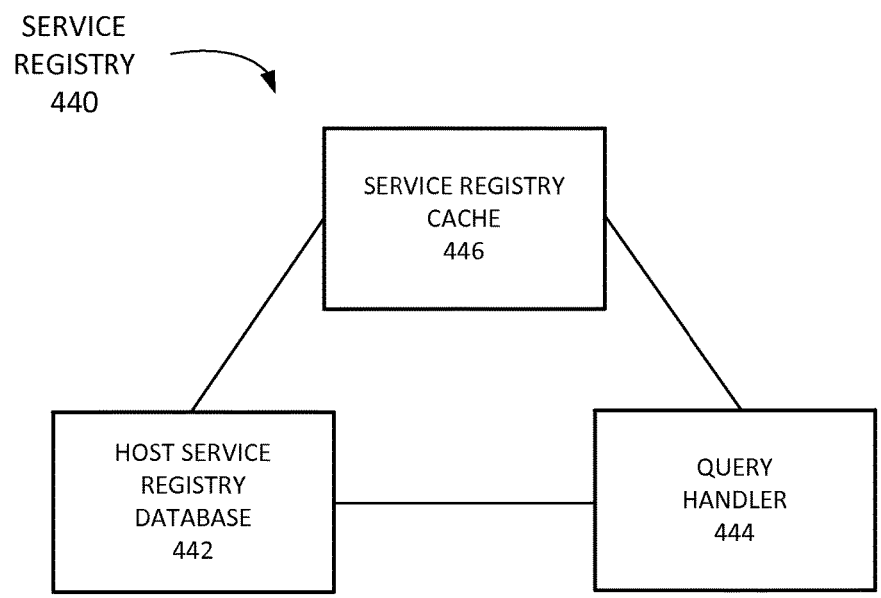
FIG. 4C is a block diagram illustrating exemplary functional components of the service registry of FIG. 4A.

FIG. 4C is a block diagram illustrating exemplary functional components of service registry 440. As shown in FIG. 4C, service registry 440 may include a host service registry database (DB) 442, a query handler 444, and a service registry cache 446.

Host service registry DB 442 may maintain a list of services 410 hosted by service host 415 and/or properties of those services. An example of a service listed in host service registry DB 442 and properties of the service is provided below with respect to FIG. 4C. Host service registry DB 442 may be populated by services 410 registering with service registry 440.

Host service registry DB 442 may also expose an interface for adding or removing listed services and reading or writing properties of the services hosted by service host 415 and/or write service properties. In one embodiment, for example, host service registry DB 442 may maintain a list of services 410 hosted by a service host 415 on a different device 130. The service host 415 on the different device may list its services in a service registry on another device using the exposed interface. Furthermore, host service registry DB 442 may expose a search query service interface accessible by other service registries. Thus, other service registries may use the search query service interface to determine whether host service registry DB 442 includes an entry that satisfies a particular query. In one embodiment, services listed in host service registry DB 442 may expire (e.g., be removed from DB 442 after a period of time if not refreshed) to help prevent DB 442 from storing outdated information.

Query handler 444 may handle queries received from client 420. In one embodiment, given a query, query handler 444 first searches the local host service registry DB 442, followed by service registry cache 446. Query handler 444 may issue a call to other service registries if the query has not been satisfied, for example. Service registry cache 446 may store data from remote service registries 440. Each service host 415 may maintain a local service registry 440 and services 410 that register with service host 415 are registered in the local service registry 440. A query from client 420 that cannot be satisfied by the local service registry 440 may be sent to one or more neighboring service hosts 415 to see if the neighboring service hosts 415 have service registries 440 that include services that satisfy the query. The remote service registry 440 may return results of the query back to the local service registry 440 and the results may be stored in service registry cache 446. In some implementations, parent nodes may cache data for their children nodes, while children nodes may not cache data for their parent nodes. In one embodiment, services listed in service registry cache 446 may expire (e.g., be removed from cache 446 after a period of time if not refreshed) to help prevent cache 446 from storing outdated information.

Although FIG. 4C shows exemplary functional components of service registry 440, in other implementations, service registry 440 may include fewer functional components, different functional components, differently arranged functional components, or additional functional components than depicted in FIG. 4C. Additionally, any one of the components (or any group of components) of service registry 440 may perform functions described as performed by one or more other functional components of service registry 440.

Figure 4D:
FIG. 4D is a block diagram of an exemplary property table for a particular service.

FIG. 4D is a block diagram of an exemplary property table 460 for a particular service. In one embodiment, an instance of a service (e.g., each instance) is associated with a property table, such as table 460. Host service registry database DB 442 may store a property table for each service registered with the corresponding service registry 440. In one embodiment, as described above, the information stored in any one service registry DB 442 may be different than information stored in other service registry databases. Exemplary property table 460 includes eight fields: ID field 462, interface field 464, service format field 468, transport protocol field 470, CPU ranking 472, disk space field 474, and RAM field 476.

Instance ID field 462 uniquely defines the instance of the particular service. The instance ID (possibly along with the node ID) may uniquely identify the service instance from any other services (of the same type or different type) in the network. In one embodiment, instance ID field 462 is an integer. In table 460, the instance ID is 6529 as an example.

Interface field 464 identifies the name of the interface of the service. In this case, the interface field 464 may also identify the type of service by the type of interface. For example, table 460 identifies the interface as "STORAGE SERVICE". Service format field 468 identifies the format used by the instance of the service. As an example, table 460 identifies the service format as "JSON". Transport protocol field 470 identifies the protocol used by the instance of the service. As an example, table 460 identifies the service format as "NODE PROTOCOL".

CPU ranking field 472 identifies the performance of the CPU associated with the service instance. In one embodiment, a scale is used (e.g., 1 to 100). Table 460 identifies the CPU ranking as 20/100 for the service in CPU ranking field 742. RAM field 476 identifies the amount of random-access memory available to the service. Table 460 identifies the available RAM as 2 GB in field 476.

Although FIG. 4D shows exemplary components of property table 460, in other implementations, property table 460 may include fewer components, different components, differently arranged components, or additional components than depicted in FIG. 4D.

Figure 5A:
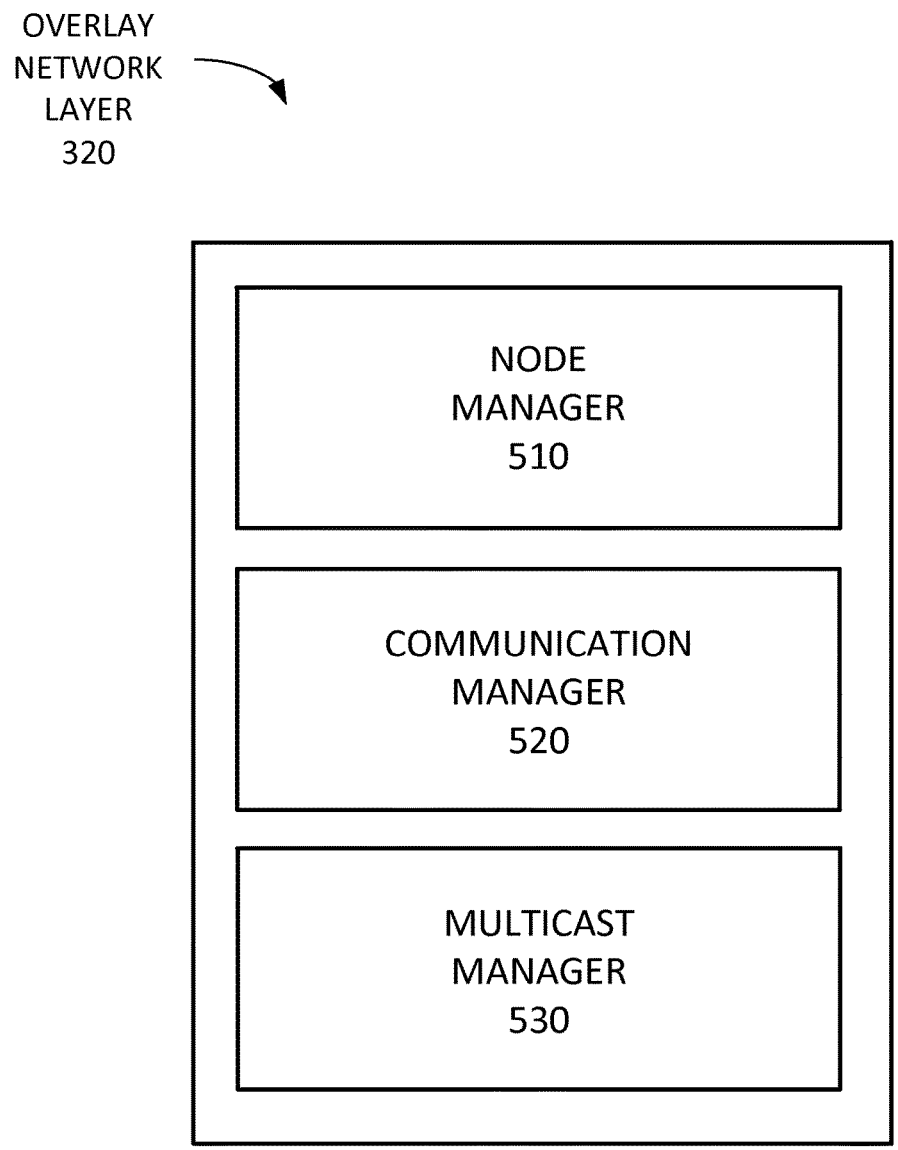
FIG. 5A is a block diagram illustrating functional components of an overlay network layer of FIG. 3.

FIG. 5A is a block diagram illustrating functional components of overlay network layer 320. As shown in FIG. 5A, overlay network layer 320 may include a node manager 510, a communication manager 520, and a multicast manager 530. Node manager 510 may provide node information, such as a node ID, to other nodes in the overlay network. Furthermore, node manager 510 may maintain a list of nodes in the overlay network. Node manager 510 may perform node discovery to identify new nodes added to the overlay network and/or to rediscover lost nodes that have re-joined the overlay network. Node manager 510 may also determine the topology of the network, as described below (e.g., which nodes are nearest other nodes).

Communication manager 520 may enable nodes to communicate with each other. Communication manager 520 may implement a mechanism to traverse the tree of the overlay network. Tree traversal may be performed in connection with search queries of service registries or when a direct communication method to another node is not available. Furthermore, communication manager 520 may implement a direct communication method that may enable particular nodes of the overlay network to communicate directly without having to traverse the tree of the overlay network.

Multicast manager 530 may implement a multicast mechanism. The multicast mechanism may be used to send a message to the members of a multicast group (e.g., all the members). Furthermore, the multicast mechanism may be used to implement a subscribe-notify messaging pattern. Thus, an event associated with a particular service instance may be used to trigger a message sent to the nodes that have subscribed to messages from the particular service instance. Multicast manager 530 may include an application layer multicast manager or a multicast manager from lower OSI layers.

Although FIG. 5A shows exemplary functional components of overlay network layer 320, in other implementations, overlay network layer 320 may include fewer functional components, different functional components, differently arranged functional components, or additional functional components than depicted in FIG. 5A. Additionally, any one of the components (or any group of components) of overlay network layer 320 may perform functions described as performed by one or more other functional components of overlay network layer 320.

Figure 5B:
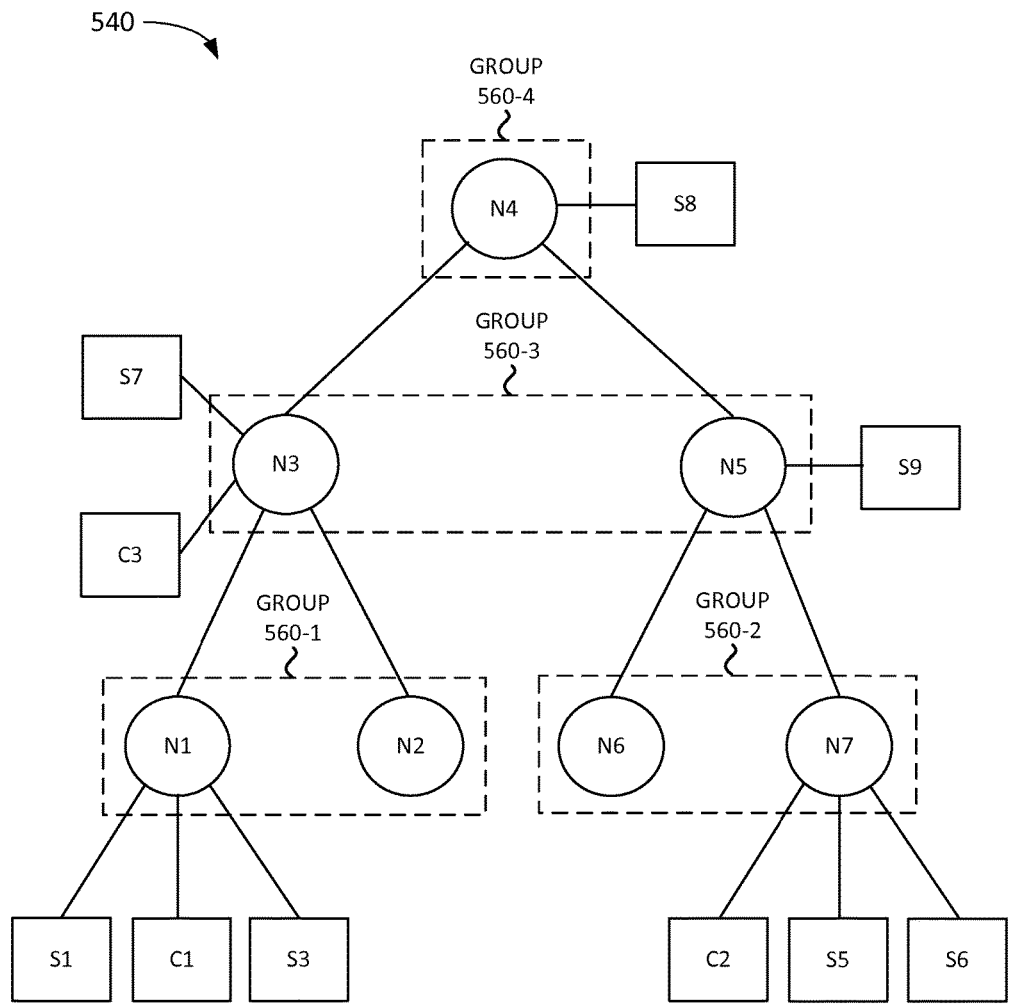
FIG. 5B is a block diagram of a tree of an exemplary functional overlay network.

FIG. 5B is a block diagram of an exemplary topology of an overlay network 540. As shown in the example of FIG. 5B, overlay network 540 includes nodes N1 to N7. Nodes N1 and N2 are in multicast group 560-1. Node N1 includes service endpoints S1 and S3 and client endpoint C1. Node N3 is the parent node to nodes N1 and N2. Node N3 includes a service endpoint S7 and a client endpoint C3.

Nodes N6 and N7 are in multicast group 560-2 and node N7 includes client endpoint C2 and service endpoints S5 and S6. Node N5 is the parent node to nodes N6 and N7 and includes service endpoint S9. Nodes N3 and N5 are in multicast group 560-3. Node N4 is the parent node to nodes N3 and N5 and is the root node of overlay network 540. Furthermore, node N4 is in multicast group 560-4 and includes service endpoint S8. Although parent nodes in the topology of network 540 have two child nodes, in other implementations, parent nodes may have more than two child nodes.

Assuming each service endpoint is associated with a service registry 440, a search query may traverse overlay functional network 540 as follows. Assume service endpoint S7 executes a search query to find (e.g., identify or search for) a particular service included in service endpoint S1 and service endpoint S5 (i.e. for which S1 and S5 are a match). Service endpoint S7 may send the search query to its local service registry, which may result in no matches in the search query. The local service registry may then identify adjacent service registries in the overlay network, which may include a service registry in node N1 and a service registry in node N4 (node N2 may not include a service registry, since there are no service endpoints associated with node N2). The service registry in node N1 may return a hit identifying service endpoint S1. The service registry in node N4 may return no hits and may forward the search query to its adjacent service registries, which in this case include service registries in nodes N3 and N5. However, since the service registry in node N3 has already processed the search, the search query may only be sent to the service registry in node N5. The service registry at node N5 may come up with no hits and may forward the search query to a service registry at node N7. Node N7 may identify service endpoint S5 as a hit and may return the results of the search query to node N4 and node N4 may forward the search results to service endpoint S7 in node N3.

Figure 6A:
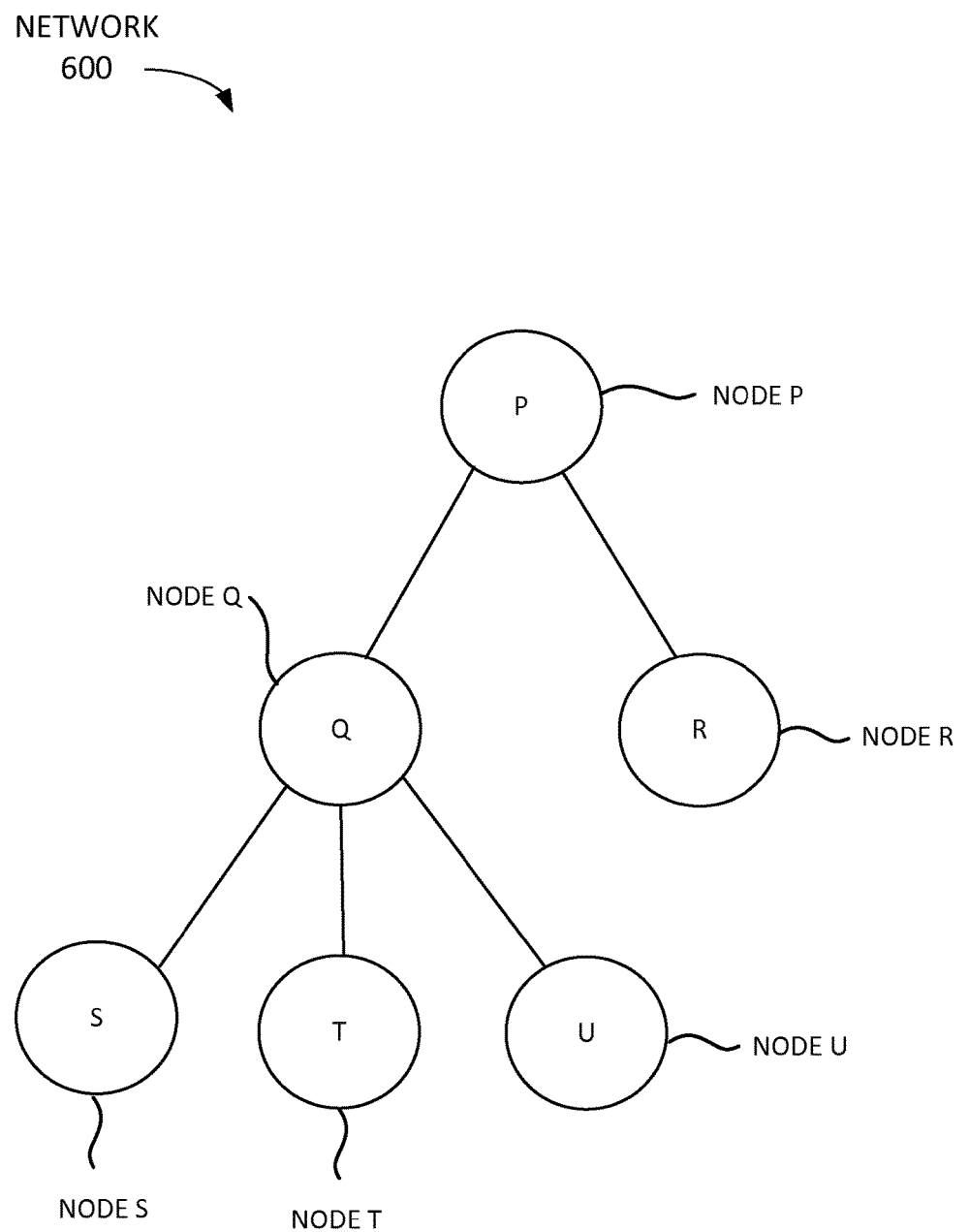
FIGS. 6A and 6B are a block diagrams of an exemplary topology of a network.
Figure 6B:
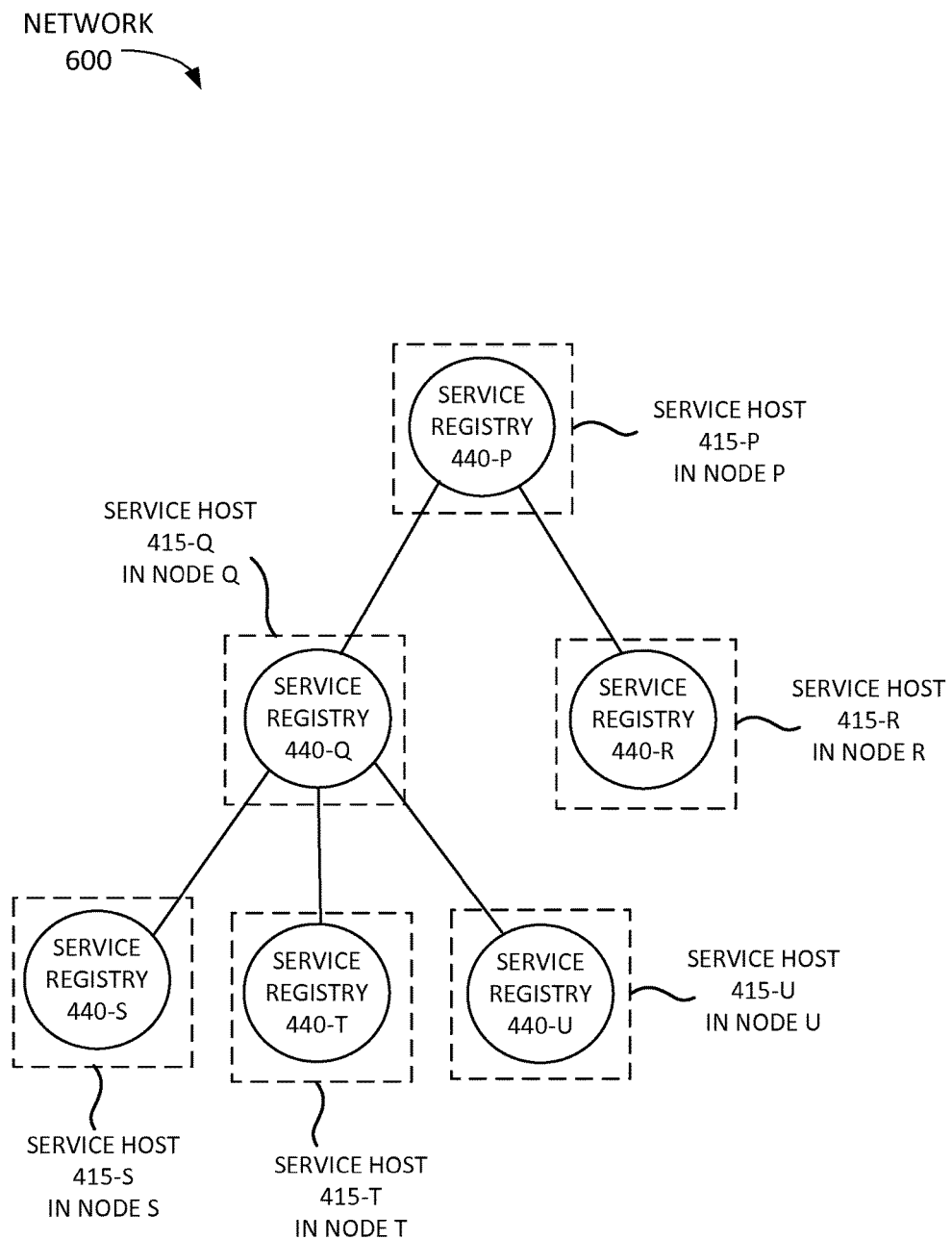

FIGS. 6A and 6B are block diagrams of another exemplary topology of a network 600 (e.g., a tree network) of nodes (e.g., each including a service host 415 (see FIG. 4A) forming a network of service registries 440). Network 600 includes six nodes: nodes P through U. Node P has two children: node Q and node R. Node R does not have any children. Node Q has three children: node S, node T, and node U. In the example of network 600, each node corresponds to a service host 415 that may include the components shown in FIG. 4A (e.g., a service 410, a client 420, a message dispatcher 430, and a service registry 440).

FIG. 6B shows the relationships of service hosts (e.g., service hosts 415-P through 415-U) and service registries (e.g., registry 440-P through registry 440-U). For the example of network 600, each service host also includes a corresponding client (client 420-P through client 420-U, not shown) and a corresponding service (e.g., service 410-P through service 410-U, not shown). Further, each service registry 440-P through 440-U includes a host service registry DB (DB 442-P through DB 442-U, not shown), a query handler (e.g., query handler 444-P through handler 444-U), and a service registry cache (e.g., cache 446-P through cache 446-U).

Figure 7A:
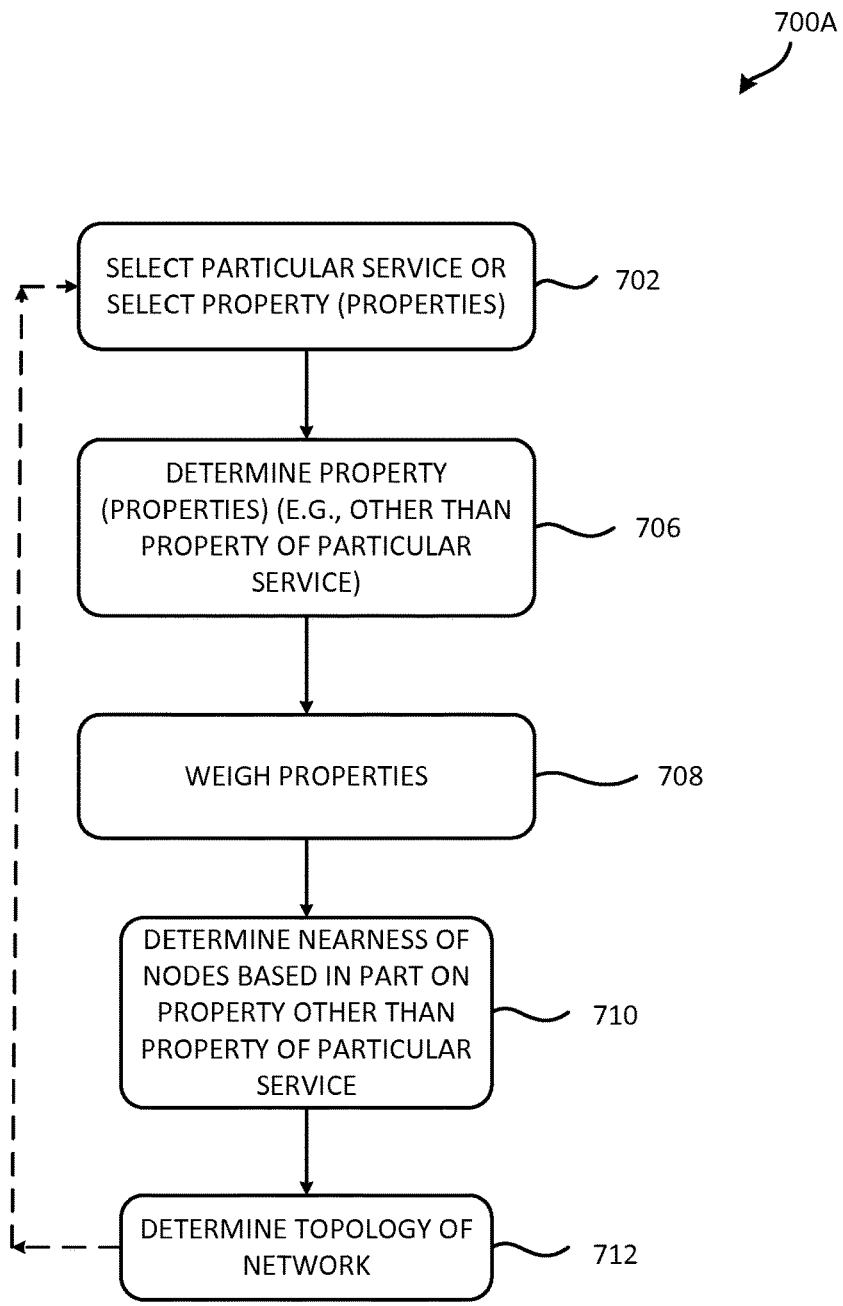
FIG. 7A is a flowchart of an exemplary process for determining the topology of a network in one embodiment.

As noted, when a client searches for a particular service, the search may propagate through the network from one node to another according to a topology. The network topology may differ depending on the particular service being searched for. For example, a search for storage capacity may be associated with a different network topology than a search for a transcoder of a particular type. FIG. 7A is a flowchart of an exemplary process 700A for determining the topology of a SOA network in one embodiment. Node manager 510 (see FIG. 5A) performs process 700A and may do so periodically. In other embodiments, however, any device in environment 100 may perform all or parts of process 700A.

In one embodiment, node manager 510 selects the particular service for which to generate a network topology (block 702). For example, node manager 510 may select "STORAGE SERVICE" as the service for which to build a topology for a network. In another embodiment, node manager 510 generates a topology without a particular service in mind, but based on one or more properties (block 702) such as a property of a node (e.g., processor speed) or a property of the relation of one node to another node (e.g., bandwidth).

Figure 7B:
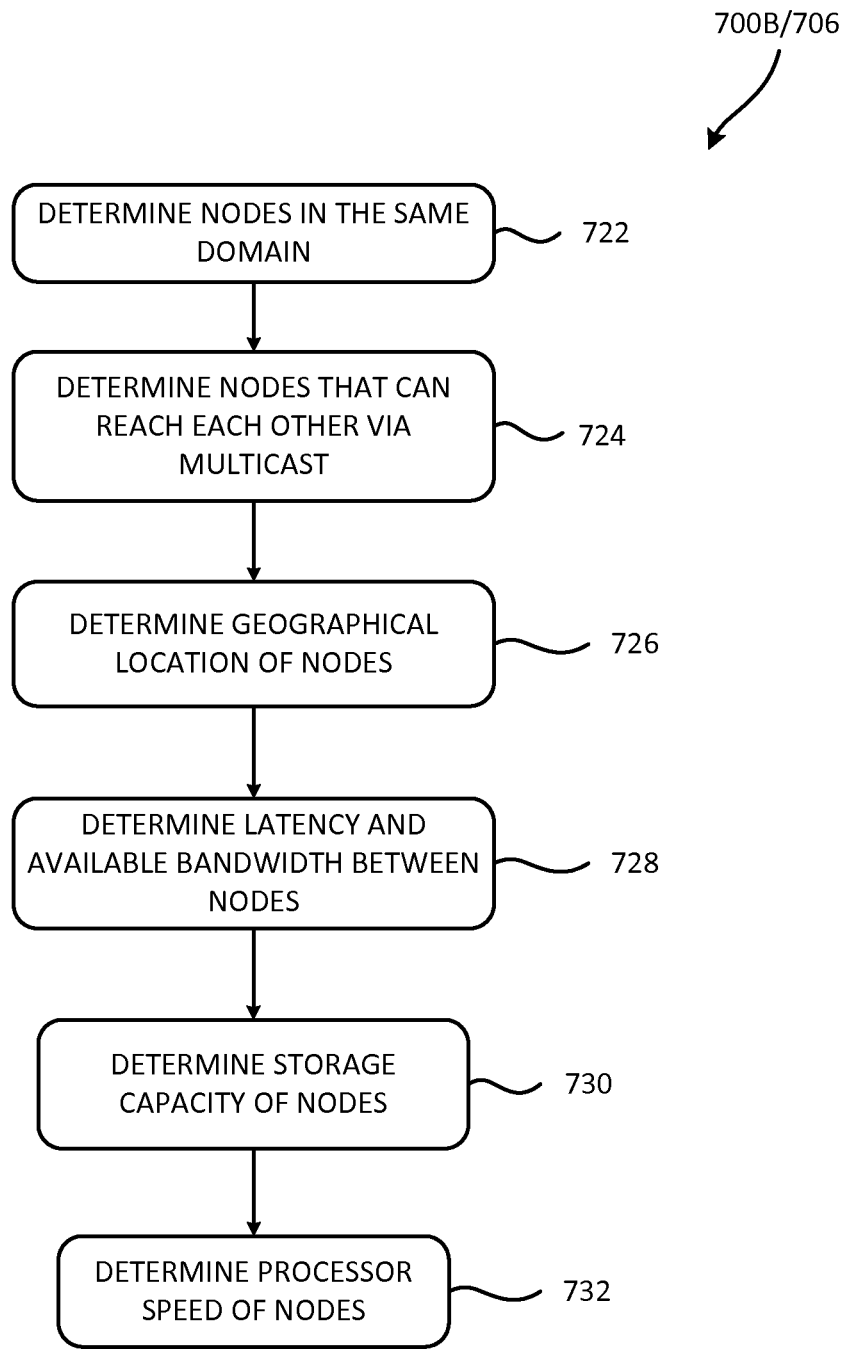
FIG. 7B is a flowchart of a process for determining properties other than a property of a particular service.

Node manager 510 may determine the topology of the network based on one or more properties. If a particular service is selected (block 702), then node manager 510 may determine the topology based on a property other than a property of the particular service. If a particular service is not selected, then node manager 510 may still determine the topology (for the property or properties selected in block 702) based on a property other than a property of the particular service (for which the topology may be used for searching for the particular service). That is, the topology may be used for searching for a particular service (e.g., even if the topology was generated without the particular service in mind) and that topology had been generated based on a property other than a property of the particular service. Accordingly, node manager 510 may also determine a property (or properties) for generating the topology (block 706) (e.g., a property or properties other than a property of the particular service). For example, FIG. 7B is a flowchart of an exemplary process 700B for determining properties other than a property of a particular service. Determining a property (or properties) (block 706) may include process 700B shown in FIG. 7B. Like process 700A of FIG. 7A, process 700B may be performed by node manager 510.

Switching to FIG. 7B to elaborate on block 706 (see FIG. 7A), process 700B may determine a plurality of properties. In one embodiment, the determined properties are not properties of the particular service (e.g., selected in block 702 or the service searched for when the topology is used for a search). For example, process 700B may include determining whether two nodes are in the same domain (block 722). Nodes in the same domain may be closer than nodes in different domains. Nodes in the same domain may be nodes behind the same firewall, for example. Process 706 may include determining whether nodes can reach each other via multicast (block 724). In some implementations, nodes that are in the same network (block 722) may be the same nodes that are reachable via multicast (e.g., multicast capability) (block 724). In other implementations, nodes that are reachable via multicast may be determined using a different technique, such as determining that the nodes are members of a same multicast group. Nodes that are reachable via multicast may be considered closer than nodes that are not reachable via multicast.

Process 700B may also include determining the geographical location of the nodes (block 726). In this case, nodes geographically closer to each other are considered closer in the topology than nodes geographically father apart. Process 700B may include determining the latency between nodes and/or the available bandwidth between the nodes (block 728). Nodes with low latency may be considered closer in the network than nodes with a higher latency. Nodes with a high bandwidth between each other may be considered closer in the network than nodes with a lower latency.

Process 700B may include determining the storage capacity of nodes (block 730). Process 700B may also include determining the processor speed or class of the nodes (block 732). Nodes with high storage capacity and high processor speeds may become parent nodes in the topology, for example. Properties (e.g., other than a property of the particular service that will be searched for) may be determined other than those shown in FIG. 7B. For example, properties (e.g. other than a property of the particular service) may include whether a channel exists and is open (e.g., open channels) between any two nodes, the number of hops (e.g., in the underlying physical network) between any two nodes, the cost (e.g., in currency) for carrying data between two nodes (e.g., mobile subscription service), geographic location (e.g., whether data would pass through a particular country), and/or network type (e.g., fiber optic, WiFi, mobile, cellular, etc.)

Returning to FIG. 7A, node manager 510 may weigh the properties (block 708) (e.g., a weight for each of the properties) for determining the network topology. Based on the weighed properties, node manager 510 can determine the nearness of each node with other nodes (block 710). The determination of nearness, in one embodiment, is based in part on a property other than a property of the particular service (block 710). Based on the nearness, node manager 510 can determine the topology of the network (block 712) for the particular service (determined in block 702) or the selected property or properties (also determined in block 702). For example, the topology may be a tree network, a mesh network, among others.

In one embodiment, node manager 510 may determine a different topology for each service. For example, node manager 510 may determine a topology for "STORAGE SERVICE" that is different than the topology for "CAMERA." In another example, node manager 510 may determine a topology for different conditions, such as latency or geographical location (or a weighted mix of any condition). In one embodiment, client 420 (e.g., the client that requested the search) may identify the topology when issuing the request. In the case where node manager 510 determines a topology for different conditions, the conditions associated with a topology may include one or more properties other than a property of the particular service identified in the search query as being searched for, for example. This embodiment allows a client to search for "a storage service with good bandwidth" when streaming a file that requires a large bandwidth. As another example, this embodiment allows for a client to search for "a storage service that is geographically near (e.g., a low latency) when streaming a file that requires a small latency. One topology may be used for geographic nearness and another topology for bandwidth. Yet a different topology may be defined and used for a combination of geographic nearness and bandwidth. In the preceding examples, the bandwidth and the geographic nearness are properties other than properties of the particular service being searched for (e.g., data storage).

Figure 8:
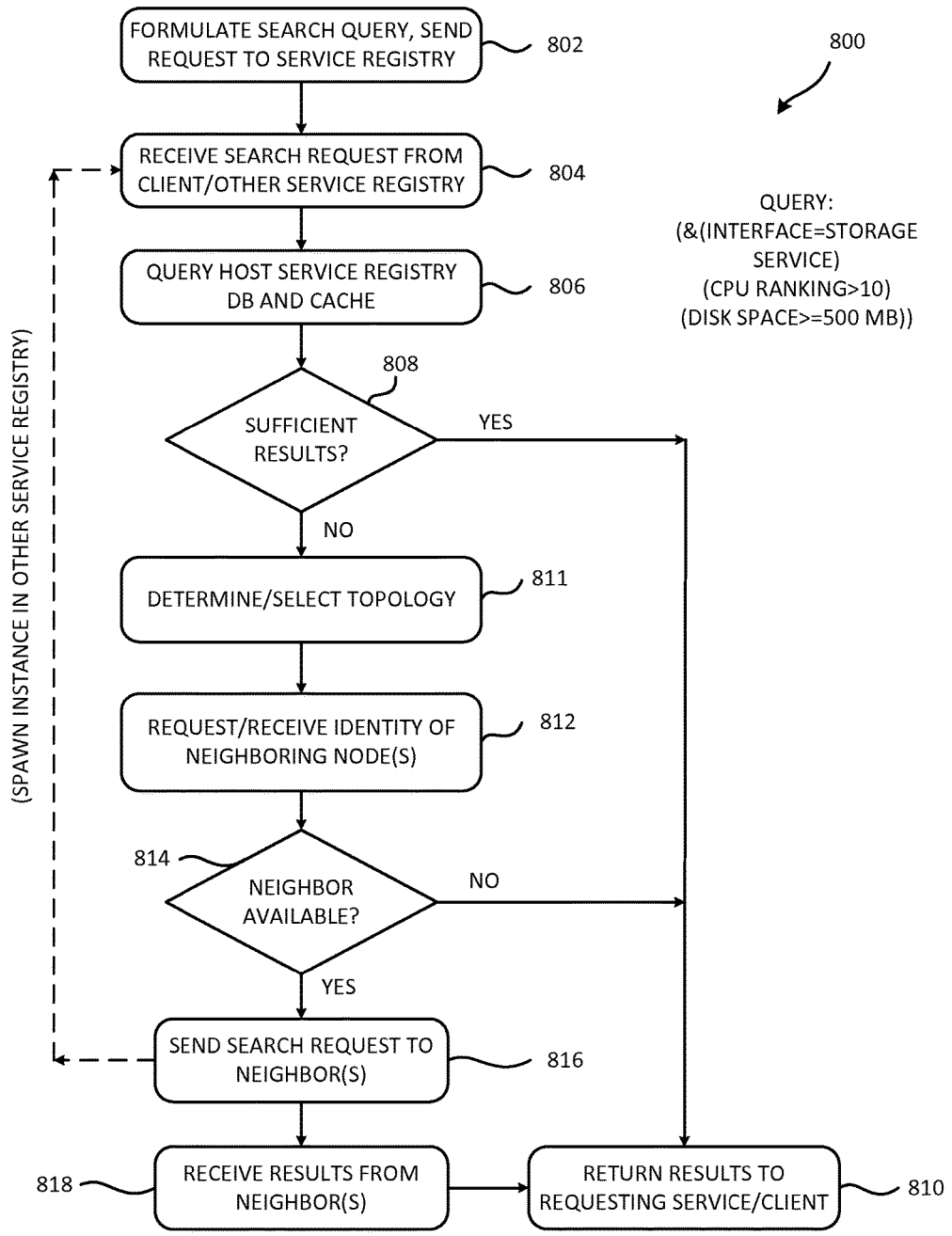
FIG. 8 is a flowchart of an exemplary process for searching for a service.

Network 600 is used in an example for searching for a service. FIG. 8 is a flowchart of an exemplary process 800 for searching for a service in a SOA network. Process 800 may execute in a service host in service layer 310 in a service host, for example. In one embodiment, process 800 (or parts of process 800) may be a recursive and/or iterative in which multiple instances of the process (or parts of the process) occur in multiple service hosts and where the process calls itself in another service host, for example. Process 800 is described with respect to network 600 of FIG. 6.

Process 800 may begin with formulating a search query in a client and sending the query to a service registry (block 802). In one embodiment, the client sends the query to the local service registry (e.g., in the same service host 415 as opposed to a service host 415 in a different node). As an example, referring to network 600, client 420-S in node S formulates a query for a particular service and sends the query to service registry 440-S in node S (block 802). As shown in FIG. 8, a query may be: (&(INTERFACE= STORAGE SERVICE) (CPU RANKING>10) (DISK SPACE>=500 MB)). The query may specify and request a number of results (e.g., a number of services, such as six). In this example, the query specifies the particular service (e.g., "STORAGE SERVICE") and a particular property of the particular service (e.g., DISK SPACE>=500 MB). The query generated by client 440-S may also specify or request a topology of the overlay network to crawl (e.g., traverse, follow, or travel). As mentioned above, the query may specify the topology for geographic closeness, latency, bandwidth, same or different domain, storage capacity, processor speed, etc., or any weighted combination of these properties.

The service registry receives the query (block 804) from the client. Continuing with the example of network 600, service registry 440-S in node S receives the query for the particular service from client 420-S (e.g., the local service registry). In particular query handler 444-S (see FIG. 4C) may receive the query. As indicated in FIG. 8 and described in more detail below, a service registry may also receive a search query from another service registry (block 804) (e.g., a service registry in a different service host 415 in a different node).

Having received a search query, the service registry queries the host service registry DB (e.g., a local database) for matching services registered in the DB (block 806). Continuing with the example above, query handler 444-S queries host service registry DB 442-S (see FIG. 4C) with the search query it received from client 420-K (block 806). The query may result in a list of registered services that match the query (e.g., satisfy the query) (e.g., a first list), if any.

If the results of the query are sufficient (block 808: YES), then the list of the registered services that satisfy the query (e.g., the first list) may be returned to the client (block 810).

Sufficient matching results may be determined, for example, by comparing the number of services in the list to a number (e.g., a number requested by the client in the search query or a default number). After the search results are returned to the client (block 810), process 800 may end (at least for the service registry 440 that received the query in block 804).

As noted above, local service registry 440-S may have a cache 446-S where service information from remote service hosts is stored for faster searches. Thus, query handler 444-S may also query service registry cache 446-S to supplement its results (or only if there are insufficient results in the local DB 442-S). The results from cache 446-S may be included in the list of services returned to the client.

Service registry 440-S may draft other service registries in the search for matching services. If the search results are not sufficient (block 808: NO), then service registry 440-S (e.g., the query handler) may determine and/or select the topology for determining neighboring nodes (block 811). In one embodiment, the topology may be identified in the query issued by client. In another embodiment, the topology may be selected based on the particular service being searched for. In yet another embodiment, query handler 444-S selects the topology based on other factors. The selected topology may include those discussed above: geographic nearness, latency, bandwidth, etc., or any weighted combination thereof. In one embodiment, a topology may be generated on-the-fly if the requested topology is not present for example.

Different topologies may better than other topologies depending on the particular service being searched for (and the best topology may be selected in block 811). For example, bandwidth may be an important property (e.g., property selected in block 706 and weighed for in block 708) for a topology when the particular service being searched for is streaming of a high definition video. On the other hand, latency may be the most important property (e.g., property selected in block 706 and weighted for in block 708) for a topology when the particular service being searched for is telephony. Accordingly, this embodiment allows for the selection of the topology most appropriate for the particular service being searched for.

The query handler 444-S may request and receive the identity of other neighboring nodes (block 812). A neighboring node may be a node in the network (e.g., network 600) that is one hop away, for example, in the selected topology (from block 811). As noted above, the neighboring node (e.g., service registry) is a neighbor (e.g., previously selected as a nearest neighbor) based on a property other than a property of the particular service being searched for. For example, the neighboring service registry for the particular service "STORAGE SERVICE" the property (other than a property of the service) may include network latency. Continuing with the example of network 600, query handler 444-S in service registry 440-S queries host service registry DB 442-S (block 806) and finds three matching services, i.e., an insufficient number of results (block 808: NO) (e.g., six results were requested by the client). As a result, query handler 444-S (see FIG. 4C) requests the identity of neighboring nodes (e.g., one hop away) from node manager 510 in the network layer 320. Query handler 444-S receives a list of neighboring nodes from node manager 510: node Q, which happens to be the parent of node S as shown in FIG. 6A.

The query handler determines if a neighboring node (e.g., a neighboring service registry) is available to forward the search (block 814). If no neighboring node is available to continue the search (block 814: NO), then the then an indication of this may be sent to the client (or another requesting service registry) along with search results, if any (block 810). In this case, process 800 may end (at least for the service registry 415 that received the query). A query handler may determine that no other neighboring node is available for a search even when node manager 510 returns a list of neighboring nodes. For example, the query handler may determine that every node in the list of neighboring nodes is or has already participated in the same search, leaving no available node to forward the search query.

If a neighboring node is available to continue the search (block 814: YES), then the service registry (e.g., the query handler) may send the search query to the service registry in the neighboring node (block 816) (e.g., a neighboring service registry). In the current example, query handler 444-S determines that node Q is available to continue the search (block 814: YES) (e.g., because service registry 440-Q is not known to have been participating in the search). Service registry 440-S forwards the search query to service registry 440-Q in node Q (block 816). As shown with a dashed line, the service registry in the neighboring node may spawn another instance of process 800 (starting at block 804 by receiving the search query from another service registry). In one embodiment, service registry 440-S adjusts the number of requested search results in the query based on the number of matching search results already found. As described in more detail below, eventually service registry 440-S may receive search results (e.g., a second list of services) from neighboring service registry 440-Q (block 818). Service registry 440-S may combine the results received from service registry 440-Q (e.g., a second list of services) with its own results (e.g., the first list from block 806) and return both lists to the client (block 810).

In the current example, service registry 440-Q receives the search query from service registry 440-S (block 804), and queries its host service registry DB 442-Q (block 806). Query handler 444-Q in service registry 440-Q queries host service registry DB 442-Q (block 806) and finds no matching services, i.e., an insufficient number of results (block 808: NO). As an example, the query received by query handler 444-Q may indicate that the number of requested results is three (e.g., the original request of six reduced by three). As a result, query handler 444-Q requests the identity of neighboring nodes from node manager 510. Query handler 444-Q receives a list of neighboring nodes from node manager 510: node S, node T, node U, and node P, as shown in FIGS. 6A and 6B. In one embodiment, if a predetermined amount of time has passed, the results may be considered sufficient (block 808: YES) despite the number of results.

Query handler 444-Q determines if a neighboring node is available to forward the search (block 814). Query handler 444-Q determines that node T, node U, and node P are available to continue the search (block 814: YES). Query handler 444-Q does not include node S, as it received the search query from service registry 440-S and node S is apparently already involved in the search. Thus, query handler 444-Q sends the search query to the service registry in neighboring node T, neighboring node U, and neighboring node P (block 816). As shown with a dashed line, the service registry in neighboring nodes T, U, and P may spawn another instance of process 800 (starting at block 804 by receiving the search query from another service registry).

Service registry 440-Q then sends the search request to service registry 440-T, service registry 440-U, and service registry 440-P (block 816). As mentioned above, in one embodiment, service registry 440-Q adjusts the number of requested search results in the query (e.g., to three) based on the number of matching search results already found. In one embodiment, the search request is sent to all available neighboring nodes so that the search in these neighboring nodes takes place in parallel. In other embodiments, the search requests (e.g., search query) can be sent in order (e.g., after each result is received or after a window of time). Sending the search requests in order may allow service registry 440-T to determine that the search results are sufficient (block 808) before sending the search request to all the available neighboring nodes (e.g., determined in block 814). Service registry 440-T receives the request (block 804) and finds one service matching the query in its host service registry DB 442-T (block 806). A total of four search results is still insufficient (e.g., less than six) (block 808: NO), however. Service registry 440-T determines and/or selects the network topology (block 811) and sends a request to node manager 510 of overlay network layer 320 for the identity of neighboring nodes (e.g., one hop away) (block 812). Node manager 510 returns the identity of node Q to service registry 440-T (block 812). Service registry 440-T, however, knows that service registry 440-Q in node Q is already involved in the search, leaving no other available neighbor (block 814: NO). Service registry 444-T sends this result (and the search result) to service registry 440-Q (block 810), ending process 800 in service registry 440-T.

Service registry 440-U also receives the request (block 804) but cannot find the service during a search of its host service registry DB 442-U (block 806), leaving an insufficient number of search results (block 808: NO). Service registry 440-U determines and/or selects the network topology (block 811) and sends a request to node manager 510 of overlay network layer 320 for the identity of neighboring nodes (e.g., one hop away) (block 812). Node manager 510 returns the identity of node Q to service registry 440-U (block 812). Service registry 440-U, however, knows that service registry 440-Q in node Q is already involved in the search (service registry 440-U received the request from service registry 440-Q), leaving no other available neighbor (block 814: NO) and sends this result to service registry 440-Q (block 810), ending process 800 in service registry 440-T.

Service registry 440-P also receives the request (block 804) and finds two services that match or satisfy the search query of its host service registry DB 442-P (block 806). Nonetheless, two results are considered less than sufficient (block 808: NO) (e.g., less than the requested three). Service registry 440-P determines and/or selects the network topology (block 811) and sends a request to node manager 510 of overlay network layer 320 for the identity of neighboring nodes (e.g., one hop away) (block 812). Node manager 510 returns the identity of nodes Q and R to service registry 440-P (block 812). Service registry 440-P, however, knows that service registry 440-Q in node Q is already involved in the search (service registry 440-P received the request from service registry 440-Q), leaving node R as the only available neighbor (block 814: YES). Service registry 444-P sends the search request to service registry 440-R (block 816), spawning another instance of process 800 in service registry 440-R. The search request may adjust the number of requested results to one (e.g., reflecting the two search results compared to the requested three).

Service registry 440-R receives the search request (block 804) and finds one service that match or satisfy the search query of its host service registry DB 442-R (block 806). One result is considered sufficient (block 808: YES) and the results are sent to service registry 440-P (the service registry that sent the search to service registry 440-R). Service registry 440-P receives the results (e.g., a list) from service registry 440-R (block 818) and may combine the received results with its own results. Service registry 440-P then sends the results to service registry 440-Q (i.e., the service registry that requested that service registry 440-P join the search). In the current example, service registry 440-P sends three results to service registry 440-Q. Service registry 440-Q receives the results from service registry 440-P (block 818), combines the received results with its own, and returns the results to service registry 440-S (block 818) (e.g., the service registry that requested that service registry 440-Q joins the search). In the current example, service registry 440-Q sends four results to service registry 440-S. Service registry 440-S receives the results (e.g., a second list of services) from service registry 440-Q (block 818). Service registry 440-S may combine the results received from service registry 440-Q (e.g., a second list of services) with its own results (e.g., three from the first list from block 806) and return the results to the client (block 810). In the current example, service registry 440-S sends seven results to the client.

As shown, the client requested six results in the original query, but received seven. Additional results may occur because service registries 440 searched in parallel. While this indicates more searching than requested (and more computational power than perhaps needed), the extra result is a small computational cost for the following possible benefits: a distributed database in which the nodes do not necessarily have a copy of the full database.

In one embodiment, when a service registry receives results from a neighbor (block 818) it may store these results in its service registry cache 446. Information stored in cache 446 may have a time-to-live (TTL) and may be deleted after a period of time. In another embodiment, a service registry does not receive results from neighboring service registries (block 818). Instead, the neighboring service registry sends the results directly to the requesting client. An advantage of this latter embodiment is that a service registry does not necessarily have to store the state of any ongoing search and whether the service registry has received a response from a neighbor. On the other hand, this latter embodiment would limit the size of cache 446, which could slow searches in the long run.

Another example of a topology of the overlay network is a mesh network, in which each node directly connects to one or more other nodes in the overlay network. Each node in the mesh network may forward traffic to nodes connected to it according to the connections in the overlay network topology (e.g., a predefined distribution pattern). A tree topology may be considered as one of many mesh topologies. As another example, one mesh topology may connect each node with every other node. In this case, each node in the network may receive a search query and the service registry 440 that received the search query from client 420 may rank search results after receiving the search results from all the nodes.

As with the tree topology discussed above, different mesh network topologies (of a group of network topologies) may be associated with different particular services being searched for (or different groupings of properties). Further, each connection in the mesh topology may be established based on a property (or properties) other than a property of the particular service being searched for. For example, each node may be connected to the four geographically closest nodes. As another example, the topology of the overlay network (whether a mesh or a tree) may be configured manually. In one embodiment, search results may be ranked based on the number of hops a service is from the requesting client 420, for example.

In the case of a mesh network, more than the requested number of search results may be returned (and accordingly additional computational resources were spent). Nonetheless, a mesh network may allow for a parallel search of a distributed database in an efficient manner. Further, a search through a mesh topology may be faster and more parallel then a search through a tree topology. A search through a mesh topology, however, may result in more network traffic and more excess search results than from the tree topology. This application incorporates by reference the following applications filed the same date as the present application: U.S. application Ser. No. 14/218,579, titled "Capability Monitoring in a Service Oriented Architecture"; and U.S. application Ser. No. 14/218,601, titled "Tunnel Broker in a Service Oriented Architecture".

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, in one embodiment, a client may send a search query to a service host and service registry other than the local service host or service registry (e.g., block 802). In this embodiment, the client may send the search query to any node in the SOA network or a particular (e.g., close) node in the SOA network. As another example, in one embodiment, node manager 510 may determine the topology of the network based on the property of the particular service (e.g., in addition to a property other than a property of the particular service).

For example, while series of blocks have been described with respect to FIGS. 7A, 7B, and 8, and an order of signal flows have been described, the order of the blocks and/or signal flows may be modified in other implementations. Further, non-dependent blocks and/or signal flows may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software). The word "exemplary" as used herein means "as an example for illustration."

It should be emphasized that the terms "comprises"/ "comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   (a) receiving, in a local service registry from a client, a search query for a particular service,
      wherein the local service registry includes a local database listing services registered with the local service registry, and
      wherein the local service registry is in a network of service registries, wherein each of the service registries includes a database listing services registered with the corresponding service registry, and
      wherein the services listed in each database, including the local database, are provided by service hosts in a network of nodes;
   (b) querying the local database to determine a first list of services that satisfy the search query;
   (c) determining, based on a property other than a property of the particular service, that one of the service registries in the network of service registries is a neighbor of the local service registry in a topology of the network of service registries, wherein the property other than the property of the particular service includes a property of a node in the network of nodes or a property of a relationship of one of the nodes to another one of the nodes in the network of nodes, and wherein the one of the service registries determined to be the neighbor is one hop from the local service registry in the topology and is a neighboring service registry;
   (d) sending the search query to the neighboring service registry, wherein the neighboring service registry includes a neighboring database listing services registered with the neighboring service registry;
   (e) receiving, from the neighboring service registry, a second list of services, registered with the neighboring service registry, that satisfy the search query; and
   (f) returning, to the client, the first list of services and the second list of services that satisfy the search query.

2. The method of claim 1,
   wherein the property of the particular service is a particular property,
   wherein the search query identifies the particular service and the particular property of the particular service, and
   wherein some of the service registries in the topology do not neighbor the local service registry in the topology, wherein the service registries that do not neighbor the local service registry are two or more hops in the topology from the local service registry.

3. The method of claim 2, wherein determining the neighboring service registry includes:
   determining the neighboring service registry based on a plurality of properties, wherein the plurality of properties are not properties of the particular service, and wherein each of the plurality of properties is weighted.

4. The method of claim 1,
   wherein the search query indicates the particular service as data storage, and
   wherein the property other than the property of the service includes bandwidth, geographic location, open channels, latency, multicast capability, number of hops between the local service registry and the neighboring service registry in an underlying network of the topology of the network of service registries, cost, or network type.

5. The method of claim 2, wherein the topology of the network of service registries is a tree.

6. The method of claim 2, wherein the topology of the network of service registries is a mesh.

7. The method of claim 1, further comprising:
(g) receiving the search query in the neighboring service registry;
(h) querying the neighboring service registry to determine the second list of services that satisfy the search query; and
(i) sending the second list to the local service registry.

8. The method of claim 7, wherein the neighboring service registry is a requesting service registry, the method further comprising:
(j) determining, based on the property other than the property of the particular service, that another service registry in the network of service registries is a neighbor of the requesting service registry, wherein the other service registry determined to be the neighbor is one hop from the requesting service registry in the topology; and
(k) determining whether the second list of services is sufficient and, when the second list is not sufficient:
sending the search query to the other service registry, wherein the other service registry includes another database listing services registered with the other service registry, and
receiving, from the other service registry, another list of services, registered with the other service registry, that satisfy the search query, wherein the second list includes the other list.

9. The method of claim 8, further comprising:
repeating element (j) and (k) in successive other nodes, and
wherein determining whether the second list of services is sufficient includes determining, when the second list is sufficient, to not send the search query to the other service registry.

10. A system comprising a device, wherein the device includes:
a memory to store a local database listing services registered with a local service registry, wherein the local service registry is in a network of service registries,
wherein each of the service registries includes a database listing services registered with the corresponding service registry, and
wherein the services listed in each database, including the local database, are provided by service hosts in a network of nodes;
a processor to
receive a search query for a particular service from a client,
query the local database to determine a first list of services that satisfy the search query, and
determine based on a property other than a property of the particular service, that one of the service registries in the network of service registries is a neighbor of the local service registry in a topology of the network of service registries, wherein the property other than the property of the particular service includes a property of a node in the network of nodes or a property of a relationship of one of the nodes to another one of the nodes in the network of nodes, and
wherein the one of the service registries determined to be the neighbor is one hop from the local service registry in the topology and is a neighboring service registry;
a transmitter to send the search query to the neighboring service registry, wherein the neighboring service registry includes a neighboring database listing services registered with the neighboring service registry; and
a receiver to receive, from the neighboring service registry, a second list of services, registered with the neighboring service registry, that satisfy the search query,
wherein the processor is configured to return to the client, the first list of services and the second list of services that satisfy the search query.

11. The system of claim 10,
wherein the property of the particular service is a particular property,
wherein the search query identifies the particular service and the particular property of the particular service, and
wherein some of the service registries in the topology do not neighbor the local service registry in the topology, wherein the service registries that do not neighbor the local service registry are two or more hops in the topology from the local service registry.

12. The system of claim 11, wherein the processor is configured to determine the neighboring service registry based on a plurality of properties, wherein the plurality of properties are not properties of the particular service, and wherein the processor is configured to weigh each of the plurality of properties.

13. The system of claim 10,
wherein the search query indicates the particular service as data storage, and
wherein the property other than the property of the service includes bandwidth, geographic location, open channels, latency, multicast capability, number of hops between the local service registry and the neighboring service registry in an underlying network of the topology of the network of service registries, cost, or network type.

14. The system of claim 11, wherein the topology of the network of service registries is a tree.

15. The system of claim 11, wherein the topology of the network of service registries is a mesh.

16. The system of claim 10, further comprising another device, wherein the other device includes:
a memory to store the neighboring database;
a receiver to receive the search query;
a processor configured to query the neighboring database to determine the second list of services that satisfy the search query; and
a transmitter to send the second list to the local service registry.

17. The system of claim 16,
wherein the neighboring service registry is a requesting service registry,
wherein the processor in the other device is configured to:
determine, based on the property other than the property of the particular service, that another service registry in the network of service registries is a neighbor of the requesting service registry, wherein the other service registry determined to be the neighbor is one hop from the requesting service registry; and
determine whether the second list of services is sufficient and, when the second list of services is not sufficient:

the processor in the other device is configured to send the search query to the other service registry, wherein the other service registry includes another database listing services registered with the other service registry; and the receiver in the other device is configured to receive, from the other service registry, another list of services, registered with the other service registry, that satisfy the search query, wherein the second list includes the other list.

18. The system of claim 17, wherein the processor of the other device is configured to not send, when the second list is sufficient, the search query to the other service registry, and wherein the system further comprises additional devices including memories, receivers, processors, and transmitters configured as the other device to successively search for services that satisfy the search query.

19. A method comprising:

receiving, from a first service registry, a request for identifying a neighboring service registry that neighbors the first service registry for propagating a search query for a particular service, wherein the first service registry and the neighboring service registry are in a network of service registries having a topology, wherein each of the service registries includes a database listing services registered with the corresponding service registry, and wherein the services listed in each database are provided by service hosts in a network of nodes, wherein the first service registry received the search query for the particular service from another service registry or a client in the network of service registries;

determining, by a processor, an identity for identifying the neighboring service registry in the topology of the network of service registries, based on a property other than a property of the particular service, wherein the property other than the property of the particular service includes a property of a node in the network of nodes or a property of a relationship of one of the nodes to another one of the nodes in the network of nodes, and wherein the neighboring service registry is one hop from the first service registry in the topology; and sending, to the first service registry, the identity for identifying the neighboring service registry for propagating the search query for the particular service.

20. The method of claim 19, wherein determining the identity includes determining the identity from a plurality of identities for identifying service registries that neighbor the first service registry, wherein some of the service registries in the network of service registries do not neighbor the first service registry.

* * * * *